United States Patent [19]

Vachon

[11] Patent Number: 4,589,180

[45] Date of Patent: May 20, 1986

[54] TOOL FOR REMOVAL OF AN ENGINE CYLINDER LINER

[75] Inventor: Louis F. Vachon, Washington, Ill.

[73] Assignee: Caterpillar Tractor Co., Peoria, Ill.

[21] Appl. No.: 725,719

[22] Filed: Apr. 22, 1985

Related U.S. Application Data

[60] Division of Ser. No. 549,130, Nov. 7, 1983, Pat. No. 4,530,141, which is a continuation-in-part of Ser. No. 490,942, May 2, 1983, abandoned.

[51] Int. Cl.[4] .......................... B23P 19/04; B25B 9/00

[52] U.S. Cl. .............................. 29/263; 29/156.4 WL; 72/393; 81/445

[58] Field of Search ............... 29/156.4 WL, 157.3 C, 29/263, 523, 727; 72/393; 81/443, 444, 445; 138/89, 89.1, 89.2, 89.3, 89.4; 277/216, 217, 218, 219, 220, 221, 222, 223, 224

[56] References Cited

U.S. PATENT DOCUMENTS

| | | | |
|---|---|---|---|
| 1,476,983 | 12/1923 | King | 72/393 X |
| 2,719,747 | 10/1955 | Layne | 29/263 X |
| 3,142,113 | 7/1964 | Cloud | 29/263 |
| 3,156,373 | 11/1964 | Willis | 138/89 X |
| 3,786,551 | 1/1974 | Gregg et al. | 29/282 X |
| 3,986,383 | 10/1976 | Petteys | 29/263 X |

FOREIGN PATENT DOCUMENTS

| | | | |
|---|---|---|---|
| 249154 | 10/1962 | Australia | 29/263 |
| 6637 | of 1914 | United Kingdom | 138/89 |

*Primary Examiner*—Howard N. Goldberg
*Assistant Examiner*—Ronald S. Wallace
*Attorney, Agent, or Firm*—Sterling R. Booth, Jr.

[57] ABSTRACT

To service an engine, it is frequently determined that a cylinder liner and piston must be replaced. Removal is difficult and time consuming if the piston is first removed through the liner and the liner is then grasped from below and pulled from the block. A method includes inserting a tool into a bore of the liner and expanding the tool into a frictional fit against the liner. A force is applied on the tool to forcibly move the liner. The piston and associated rings and rod are held in place in the liner by a partial vacuum for removal with the liner as a complete unit.

11 Claims, 6 Drawing Figures

Fig. 5
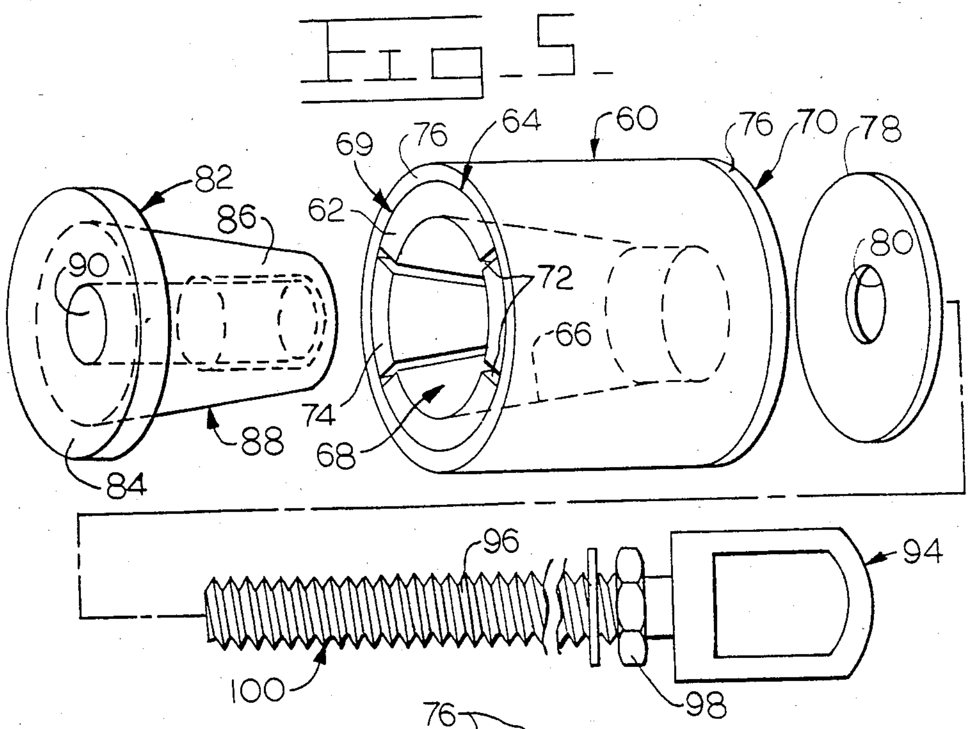
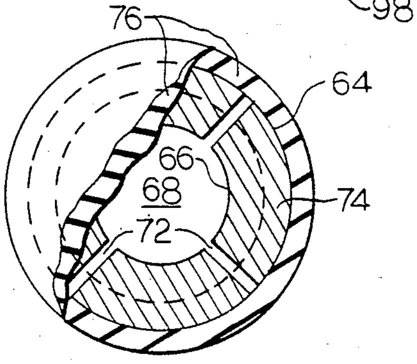
Fig. 6

TOOL FOR REMOVAL OF AN ENGINE CYLINDER LINER

This is a division of Ser. No. 549,130 filed Nov. 7, 1983, now U.S. Pat. No. 4,530,141 issued July 23, 1985, which is a continuation-in-part of Ser. No. 490,942 filed May 2, 1983, now abandoned.

DESCRIPTION

1. Technical Field

The invention relates to removal of a cylinder liner, piston, ring and rod from an engine, and more particularly the invention relates to a method of removing such engine components as a unit.

2. Background Art

Internal combustion engines commonly utilize cylinder liners to define the bores in which the pistons reciprocate. During operation of the engine, the combustion process results in a carbon build-up or wear step near the top of the point of piston travel in the liner. This and other types of wear usually necessitate replacement of the cylinder liners and pistons after a period of time.

Removal of the liners, however, is complicated by an interference fit between the liners and the block. The interference fit is established, for example, by O-rings about the liners and it generally increases because of the high temperatures and other conditions of engine use. Heretofore, a liner without air inlet ports therethrough has commonly been removed by inserting a tool down into the bore which may then be adjusted to grasp the end face of the liner. The liner is then pulled from the block by applying sufficient force on the tool to overcome any interference fit.

A disadvantage of this practice is that the piston must first be removed through the top of the associated cylinder liner so that the tool may be inserted in the liner. Performing these individual steps is inconvenient and time consuming, particularly where the carbon build-up or wear step is pronounced and must first be removed by grinding in order to the slide the piston out of the bore.

In two cycle engines where the liners have an inlet port, it is known to insert into the liner a tool which has a rod with two ends. Each of the ends are positioned in opposite ports in the liner, and the engine rotated to urge the associated piston against the rod for dislocating the liner. This practice is described in U.S. Pat. No. 3,805,359 which issued to Webb on Apr. 23, 1974. U.S. Pat. No. 3,945,104 which issued to Brookover on Mar. 23, 1976, shows another such tool in which an impact device is slidable on the tool to strike an anvil and break the liner loose. It will be noted, however, that this type of removal practice still requires separate steps to remove the piston and rod.

The present invention is directed to overcoming one or more of the above problems.

DISCLOSURE OF THE INVENTION

In one aspect of the present invention, a method is employed for removing a cylinder liner, piston, ring and rod as a unit from an engine block. The method includes inserting a tool in the bore of the liner, expanding the tool against the liner and establishing frictional contact between the tool and liner. The method further includes applying a force on the tool and moving the tool with the liner relative to the engine block, establishing at least a partial vacuum in the liner above the piston, and then removing as a unit the liner with the piston, ring and rod.

In another aspect of the present invention, a method includes inserting a tool having a driver and mandrel in the bore of the cylinder liner and moving the piston against and urging the driver into an aperture of the mandrel. The method further includes applying a force on the mandrel in the direction of piston travel and diametrically expanding the mandrel into frictional engagement with the liner in response to the driver being urged into the mandrel, and moving the tool with the liner relative to the engine block. At least a partial vacuum is established in the liner above the piston, and the liner together with the associated piston, ring and rod are removed as a unit.

In still another aspect of the invention, a tool for removing a cylinder liner from an engine block has a mandrel and a driver. The driver is insertable into an aperture of the mandrel. Means is provided for applying a force on the driver for moving the driver to a preselected first position in an aperture of the mandrel.

The cylinder liner, piston and other associated components are removed as a unit to simplify engine repair work. Removal as a unit obviates separate operations which involve first removing the piston through the liner and then insertion of a tool to grab the underside of the liner in order to pull the liner out of the block.

BRIEF DESCRIPTION OF THE DRAWINGS

FIG. 5 is a diagrammatic view of an embodiment of the present invention showing a tool which may be used to perform a method of the present invention; and FIG. 6 is a diagrammatic end view in partial section of the tool of FIG. 5.

BEST MODE FOR CARRYING OUT THE INVENTION

Figure 1:
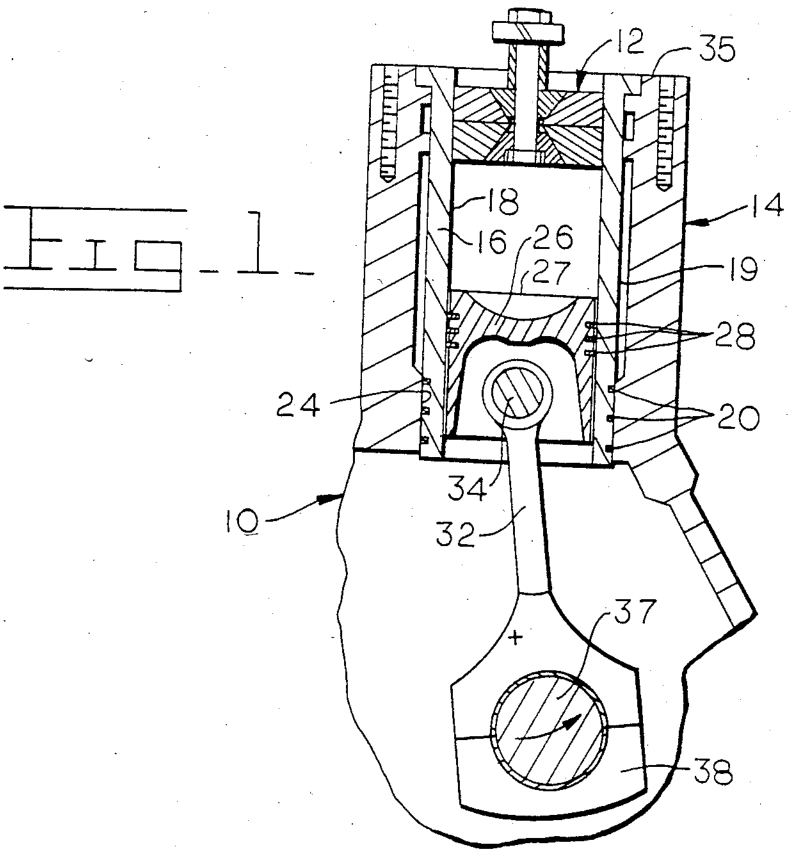
FIG. 1 is a diagrammatic view of a portion of an engine and a tool in place on the engine for performing an embodiment of the method of the present invention.

Referring to FIG. 1, a portion of an internal combustion engine 10 is disclosed to illustrate a "cylinder" of the engine. Disregarding for the moment the tool 12, the engine has a block 14 in an opening of which is located a cylinder liner 16 forming a cylinder bore 18 of the engine. The outer surface 19 of the cylinder liner is sized for a "pilot" fit with the block opening and has O-rings 20 positioned in grooves on a lower portion of its outer surface. When the liner is fitted to the block, the O-rings establish an interference fit on the lower step 24 of the block.

A piston 26 having a top surface 27 and with rings 28 retained in grooves on its outer surface is positioned in the cylinder bore 18. The piston pivotally connects to a rod 32 by conventional means which includes a wrist pin 34. The rod is connected to a crankshaft 37 by use of a rod cap 38. The engine head (not shown) fits over the top surface 35 of the block 14. The construction and operation of such engines are understood in the art and will not be further explained.

Figure 2:
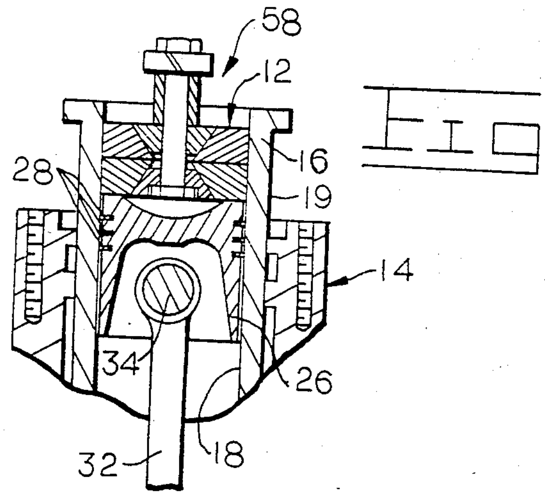
FIG. 2 is similar to FIG. 1, but illustrates an intermediate step during the disclosed method.
Figure 3:
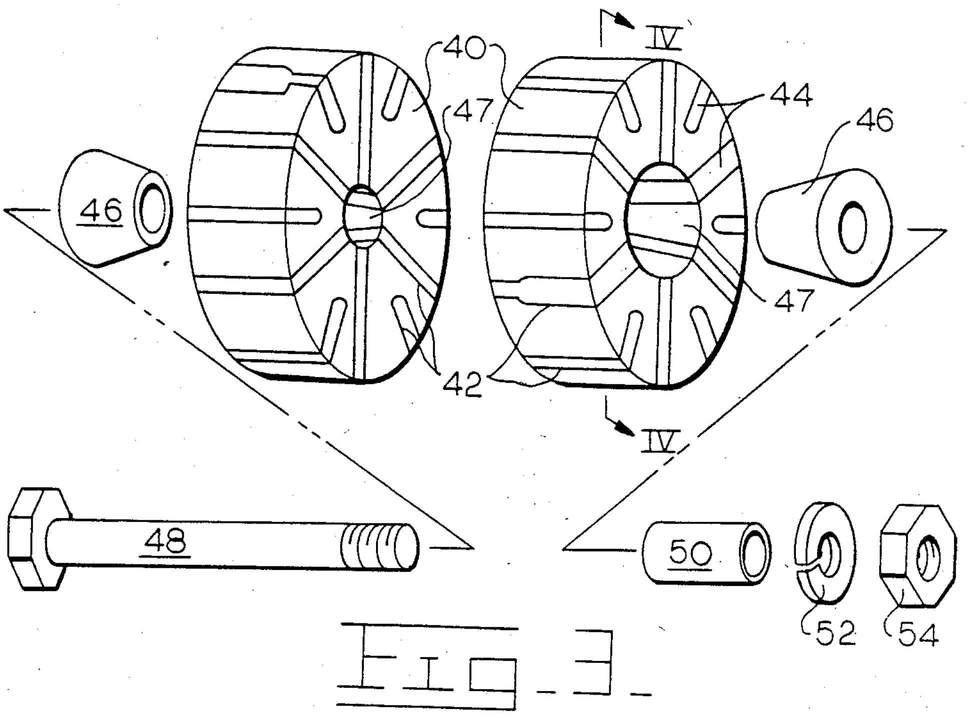
FIG. 3 illustrates in detail the tool shown in FIG. 1 which may be used to perform a method of the present invention.
Figure 4:
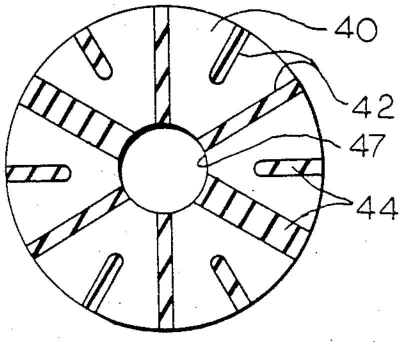
FIG. 4 is a view in cross-section of one portion of the tool of FIG. 3 taken along line IV—IV of FIG. 3.

Referring now particularly to FIGS. 3 and 4, an embodiment of a tool 12 which may be employed to remove a cylinder liner, piston with one or more rings, and rod in their assembled or operational relationship is shown. The tool is diametrically adjustable such that it can be inserted into the cylinder bore 18 even where a carbon build-up or wear step is present on the liner 16. The tool has two segments 40 which may be described as single-tapered collets with slots 42 such as are often used to make chucks for holding workpieces during machining operations. The segments are constructed of metal with the slots filled or sealed with an elastomeric or plastic material identified by reference numeral 44. Two tapered arbors 46 are receivable in tapered openings 47 in the segments 40. The arbors are of metal construction and each may be slotted to receive a key for engagement with a slot in its respective segment. A bolt 48 is positionable through openings in the segments and arbors. One of the arbors is counterbored to receive the bolt head (see FIGS. 1 and 2). The bolt is also positionable through openings in a spacer 50 and oversized washer 52 and is at one end threadably engageable with a nut 54. It will be seen that when the tool is assembled and the nut is turned relative to the bolt, the tapered arbors will be urged further into their respective tapered openings causing the segments to expand diametrically.

The tool 12 of FIGS. 3 and 4 is shown in FIGS. 1 and 2 to, as later described, illustrate removal from the engine 10 of a unit 58 defined to include the cylinder liner 16, piston 26, rings 28 and rod 32 assembled together in their operational relationship.

Another embodiment of tool 12 is shown in FIGS. 5 and 6. That tool has a mandrel 60 with a circumferential wall 62. The circumferential wall 62 has an outer surface 64 defining a diameter of the mandrel and an inner surface 66, at least partly tapered, defining an aperture 68. The aperture is shown opening on first and second ends 69,70 respectively, of the mandrel. The mandrel also has a plurality of slots 72 dividing the circumferential wall into segments 74 such that diametrical expansion of the mandrel tends to occur in response to forces exerted on the inner surface. The slots preferably are symmetrically located and extend substantially the length of the mandrel so expansion will be essentially uniform. The mandrel also desirably has its outer surface and second end covered with a flexible, preferably elastomeric, cover 76. A cap 78 having an opening 80 therethrough is also positionable on the second end of the mandrel.

The tool 12 further has a driver 82 which has a base 84 and a body portion 86 with tapered walls 88. The tapered walls extend from the base and define a frustoconical shape. The body portion is insertable into the aperture 68 from the first end 69 of the mandrel 60. The driver also has an opening 90 therethrough which is at least partly threaded. The base of the driver extends across the first end of the mandrel when the body portion is positioned in the mandrel.

Means 94 is provided for applying a force on the driver 82 for moving the driver, once inserted into the mandrel 60, to a preselected position in the aperture 68 at which the body portion 86 urges against the inner surface 66 tending to enlarge the diameter of the mandrel. The means includes a threaded rod 96 with a nut 98 and a threaded portion 100 which engages with the threaded portion of opening 90 of the driver so that the driver may be "pulled" into position in the mandrel by progressively tightening the nut against the cap. It will be seen that the body portion is movable to succeeding positions in the aperture because the tapered wall of the body portion will slide along the tapered inner surface 66 defining the aperture when sufficient force is applied to the driver. At each succeeding position the tapered walls of the body portion will increasingly forcibly urge against the inner surface tending to define a larger diameter of the mandrel.

A tool 12 such as illustrated is inserted into the cylinder bore 18 and expanded against the inner walls of the cylinder liner 16 (FIG. 1). Expansion establishes a frictional fit or contact between the cylinder liner and the outer surface of the tool. For example, with the tool of FIGS. 3 and 4, the bolt 48 is adjusted to establish frictional forces between the tool and liner greater than those of the fit of the liner in the bore 18. The tool of FIG. 5 also facilitates this practice by adjustment of the nut 98. Uniform diametrical expansion and metal-rubber construction, characteristics of the illustrated tools, substantially eliminate damage to the liner. A force is subsequently applied on the tool in a longitudinal or axial direction relative to the liner. Because of the frictional fit of the tool with the liner, sufficient force on the tool "breaks" the interference fit and the liner will move with the tool from its position in the engine block 14 (FIG. 2). The liner is thus removable from the block.

Sufficient force for removal may be applied to the tool 12 by moving the piston 26 in the bore 18 and engaging the piston with and urging it against the bottom of the tool. The piston is moved by rotating the crankshaft 37 with, for example, an engine turning tool which engages the flywheel in much the same fashion as the engine starter pinion. The force on the tool 12 may also be applied on the top of either of the described tools such as by positioning a bar across and spaced from the top of the tool. The bar, for example, may be supported by spacers resting on the top surface 35 of the block 14. For the tool of FIG. 3, a rod passes through an opening in the bar with one end attached to the tool and the other end threadably engaged by a nut. The nut may be adjusted working against the bar to raise the rod thereby applying a lifting force to the tool. For the tool of FIG. 5, the threaded rod 96 passes through the bar. An additional nut is tightened against the cap 78 to hold the threaded portion in place in the driver while nut 98 is adjusted to provide the lifting force. Other devices may also be used.

The tool 12 of FIGS. 5 and 6 also facilitates removing the unit 58 by using movement of the piston 26 to provide both the force for removal and the force for expansion of the tool. At the outset, the mandrel 60 need only be held against movement in the cylinder liner 16 with sufficient force to resist the tendency of the mandrel to slide in the liner as the piston initially moves against the driver. This force may be established, for example, by use of the threaded rod 96 and nut 98 to diametrically expand the mandrel to a preselected frictional engagement with the liner. Thereafter, further piston movement progressively urges the driver into the mandrel to succeeding positions, and the mandrel is expanded diametrically thereby increasing the frictional force holding the tool in the liner. Simultaneously, a force is also increasingly exerted on the tool in the direction of piston travel until the liner breaks loose in the bore 18. For the above purpose, it is expected that the relative tapering configurations and other aspects of the mandrel and driver can be established by one skilled in the art. Normally, the base 84 against which the piston urges should be as large as possible to spread out the forces applied.

For the engine 10 shown, movement of the tool 12 and liner 16 by the piston 26 or other device applying the force need be only that sufficient to break the interference fit of the O-rings 20. In other engine configurations more tool-liner movement may be desirable or necessary depending upon the nature of the interference fit of the liner and engine block 14.

At least a partial vacuum is to be established in the liner 16 above the top surface 27 of the piston 26 to maintain the unit 58 intact for and during removal. The tool 12 may be used throughout removal as an air-tight covering with the vacuum being established in the liner between the tool and piston. As an example, expanding the tools shown also establishes an air-tight fit or contact between the tool and liner to facilitate forming the vacuum. Alternately, the tool may be removed to be used on other cylinders or engines with a cap being put in place on the top of the liner to act as the air-tight covering. The cap, for example, may be a plastic plug which simply fits snugly into the bore 18 and "seals" against the liner's inner surface. The vacuum is established between the plug and the piston.

Experience has shown that conditions for generating sufficient vacuum may be established by having the piston 26 in contact or closely adjacent the tool 12 or cap prior to lifting the liner from the block 14 (See FIG. 2). The vacuum is established from the tendency of the piston to move downwardly when the liner is lifted with the piston, rings 28 and interconnected rod 32 unsupported.

It should be understood that the disclosed method may be practiced with additional steps, and that the order of steps may be varied as evident from the discussion herein, without departing from the invention.

Industrial Applicability

It is believed removal of the unit 58 from the engine block 14 is sufficiently clear from the above. However, a brief discussion follows so that one may more fully appreciate the advantages of servicing an engine in the disclosed manner.

Initially, with the head of the engine 10 removed, it is desirable and may even be necessary to rotate the crankshaft 37 and position the piston 26 at a desired travel point in the cylinder bore 18 to facilitate positioning the tool and completing the removal process. The tool 12 is inserted into the bore preferably far enough such that it will not be over the carbon build-up or wear step.

Experience will indicate the desired initial position of the piston for a particular engine and tool. It is suggested that the piston be positioned such that, at the time of lifting the liner from the block, it will be adjacent or in contact with the tool 12, or cap if used, to facilitate establishing the vacuum. Where the piston 26 is to be used to move the tool 12 and liner 16, its initial position is preferably on the upstroke such that it will be adjacent or in contact with the tool. This minimizes the resistance to piston movement from air trapped by the tool in bore 18 which must leak past the rings. One practice which works well is to insert the tool in the cylinder bore 18 and rest it on the piston. For the tool of FIG. 3, the bottom segment 40 would rest on the piston, while for the tool of FIG. 5, the base 84 of the driver 82 would rest thereon. This permits one to simply rotate the crankshaft 34 to move the piston and tool to desired positions prior to diametrically expanding the tool, if necessary, and then to expand the tool in contact with the piston to facilitate the removal process.

The tool 12 is "expanded" to establish the frictional fit. The air-tight fit is simultaneously established without additional "sealing" such that the tool may be satisfactorily used during the entire removal process. It may be necessary for sufficient vacuum, however, to use an O-ring at the head of the bolt 48 in the tool of FIG. 3, or to otherwise prevent air flow along the bolt. It will be noted that the bolt head being recessed in the counterbore of the arbor 46 eliminates piston damage from the bolt head 26 and holds the bolt from movement during tool expansion. Also, the arbors 48 being keyed to their respective segments 40 prevents relative movement therebetween. In the tool of FIG. 5, the elastomeric cover 76 performs the function of sealing to establish the vacuum.

The cylinder liner 16 is next unseated to break the interference fit by applying sufficient force to the tool 12 as previously explained. If desired, the tool may then be removed and used to unseat the next liner on the engine for which a piston 26 is in proper position. A cap is fitted in the freed liner so that the vacuum may be established for completing removal. Otherwise, the tool is maintained in place. Next, the rod cap 38 is removed and the liner or tool where present grasped to pull the liner free of the block 14. The oversized washer 52 shown with the tool of FIG. 3 or the eye portion of the tool of FIG. 5, for example, is a convenient point at which to connect the tool being used to an overhead device if needed for lifting purposes. With the partial vacuum, the piston 26, rings 28 and rod 32 will, without being supported, move free of the engine 10 together with the liner for removal as the unit 58.

Other aspects, objects and advantages will become apparent from a study of the specification, drawings and appended claims.

I claim:

1. A pulling tool for inserting into and frictionally engaging a cylinder liner for removal of said cylinder liner from an engine block in response to a force applied on said tool, comprising:

a segmented mandrel having a circumferential wall, first and second ends and a plurality of longitudinal slots, said circumferential wall having an outer cylindrical surface defining the diameter of said mandrel and a tapered inner surface defining an aperture opening on said first end and being divided into segments by said slots;

a driver having a base and a body portion, said body portion having a frusto-conical shape and being insertable into said aperture and movable to succeeding positions at which said frusto-conical shape increasingly forcibly urges against said tapered inner surface of said mandrel to force said outer surface to a correspondingly larger diameter, said base extending across said first end of said mandrel when said driver is inserted in said mandrel;

a cap at said second end of said mandrel;

means cooperating with said driver and said cap to move them toward each other forcing said body portion against the tapered inner surface of the mandrel to expand the mandrel radially; and a flexible, elastomeric cover attached to and extending over substantially the entire outer cylindrical surface of the mandrel for frictionally engaging the cylinder liner, the cover being supported by its engagement with the mandrel.

2. The tool, as set forth in claim 1, wherein the means cooperating with said driver and cap is a threaded rod extending from an opening in said driver and an opening in said cap.

3. The pulling tool, as set forth in claim 1, including means for sealing the mandrel radially inwardly of the elastomeric cover to provide an airtight seal.

4. The pulling tool, as set forth in claim 1, wherein the flexible elastomeric cover extends over the outer cylindrical surface of the mandrel and the second end of the mandrel for covering the slots to provide an airtight seal.

5. The pulling tool, as set forth in claim 1, wherein there is a single driver and wherein the tapered inner surface of the mandrel extends a major portion of the length of the mandrel from the first end.

6. The pulling tool, as set forth in claim 1, wherein the base of the driver is substantially as large as the circumferential wall at its second end.

7. The pulling tool, as set forth in claim 1, wherein the driver has an opening having threads that end short of the base.

8. A tool for inserting into a tubular member and for gripping said tubular member in response to a force applied on said tool, comprising:

a longitudinally-segmented, hollow mandrel having a circumferential wall and first and second ends, said circumferential wall having an outer surface defining a diameter of the mandrel and a tapered inner surface;

a driver having a base and a frusto-conical body portion insertable into said hollow mandrel and into engagement with its tapered inner surface, the frusto-conical body portion being movable to succeeding positions at which said frusto-conical body portion increasingly forcibly urges said outer surface to a correspondingly larger diameter;

means for applying a force on said driver to force it into the hollow mandrel and to said succeeding positions; and a flexible cover on the outer surface of said circumferential wall to frictionally engage said tubular member.

9. The tool, as set forth in claim 8, wherein said flexible cover is an elastomeric material.

10. The tool, as set forth in claim 8, wherein said flexible cover engages the entire outer surface of said mandrel.

11. The tool, as set forth in claim 8, including a cap at said second end of said mandrel, and wherein said means for applying force on said driver is a threaded rod extending from said driver at said first end to the cap.

* * * * *